United States Patent [19]

Mrcun

[11] 4,075,519
[45] Feb. 21, 1978

[54] BRUSHLESS ALTERNATOR

[76] Inventor: Ivan Mrcun, Kajuhova 4, Domzale, Yugoslavia, 61230

[21] Appl. No.: 624,934

[22] Filed: Oct. 22, 1975

[30] Foreign Application Priority Data

Nov. 22, 1974 Yugoslavia ............................. 2819/74
Nov. 22, 1974 Yugoslavia ............................. 2820/74

[51] Int. Cl.² ............................................. H02K 7/00
[52] U.S. Cl. .................................. 310/67 R; 310/263
[58] Field of Search ................. 310/67, 263, 257, 266, 310/49, 156

[56] References Cited

U.S. PATENT DOCUMENTS

| 3,206,623 | 9/1965 | Snowdon | 310/263 |
| 3,466,476 | 9/1969 | Snowdon | 310/67 |
| 3,517,504 | 6/1970 | Sakamoto | 310/263 |
| 3,535,566 | 10/1970 | Smith | 310/266 |
| 3,610,979 | 10/1971 | Thomas | 310/263 |
| 3,783,313 | 1/1974 | Mathur | 310/67 |

FOREIGN PATENT DOCUMENTS 158,333 10/1963 U.S.S.R. .............................. 310/263

Primary Examiner—R. Skudy
Attorney, Agent, or Firm—Karl F. Ross

[57] ABSTRACT

An electrical machine, especially an alternator, has a housing axially split into two generally symmetrical halves in which a rotor shaft is journaled. Held between the two housing halves are parts of stator teeth which coact with two relatively offset sets of rotor poles mounted on the shaft, the teeth being interconnected inside or outside the rotor by an annular magnetic yoke. A stationary excitation coil, surrounding a split inner hub of the rotor body, is carried within the rotor by the yoke or by a tooth-supported ring to generate a flux magnetizing the poles. The teeth have wings closely spaced from the orbital paths of the poles and also have webs, about half as wide as their wing span, enveloped by armature windings in which the output voltage of the alternator is induced upon a turning of the rotor.

10 Claims, 6 Drawing Figures

BRUSHLESS ALTERNATOR

FIELD OF THE INVENTION

The present invention relates to an electrical machine, more particularly an alternator of the brushless type.

BACKGROUND OF THE INVENTION

Conventional alternators, in which slip rings and contact brushes are used to deliver the generated output voltage from a rotating armature winding to a load or to energize an excitation coil of a rotating electromagnet, are subject to various disadvantages such as noise, sensitivity to dust and oxidizing atmospheric conditions, and sparking which makes such machines unsuitable for use in explosive atmospheres. The same drawbacks exist in electric motors provided with such slip rings and brushes.

OBJECTS OF THE INVENTION

The general object of my present invention, therefore, is to provide an improved electrical machine of the brushless type which is of simple construction and obviates the aforestated disadvantages.

A more particular object is to provide an alternator, of either the single-phase or the three-phase type, having a higher power output than conventional alternators of comparable weight and dimensions.

SUMMARY OF THE INVENTION

An electrical machine according to my present invention comprises two relatively rotatable members centered on a common axis, one of these members (referred to hereinafter as the rotor) having a magnetically permeable body which includes a magnetized central hub whose extremities are rigid with two axially spaced annular arrays of pole pieces; the pole pieces of one array, having substantially axially extending faces on one side of a transverse midplane, are peripherally offset from the oppositely polarized pole pieces of the other array which have substantially axially extending faces on the opposite side of that midplane. The other member, referred to hereinafter as the stator, is also magnetically permeable and includes a set of peripherally spaced generally T-shaped teeth which carry armature windings and are positioned for magnetic interaction with the pole pieces, the teeth being mechanically and magnetically interconnected by an annular yoke centered on the axis. Unless the hub is formed in whole or in part by a permanent magnet, its magnetization is maintained by a stationary excitation coil concentrically surrounding it with intervening spacing, that coil being supported on the stator.

In accordance with an important feature of my invention, the "T" of each tooth has a stem passing radially along the aforementioned midplane between the two arrays of pole pieces and an axially extending cross-bar positioned to pass close by the substantially axially extending faces of these pole pieces upon relative rotation of the two members, either outside or inside the rotor. The latter arrangement, in which the major tooth portions as well as the excitation coil lie in an annular space between the pole pieces and the hub, is particularly described and claimed in my copending application Ser. No. 624,933 of even date whose disclosure is incorporated by reference in the present application.

The cross-bar of each tooth advantageously includes a radially extending web surrounded by the associated armature winding and a pair of wings extending laterally from this web adjacent the pole pieces, a preferred wing span being about twice the width of the web as measured in the axial direction. The spacing of the teeth with reference to that of the pole pieces and the electrical interconnection of the armature depends, of course, on the desired type of output voltage (e.g. single-phase or three-phase) as is well known per se.

Although reference will be made only to an alternator in the following description, it will be apparent that an analogous construction may be adopted for an electric motor.

BRIEF DESCRIPTION OF THE DRAWING

The above and other features of my invention will now be described in detail with reference to the accompanying drawing in which.

SPECIFIC DESCRIPTION

Figure 1:
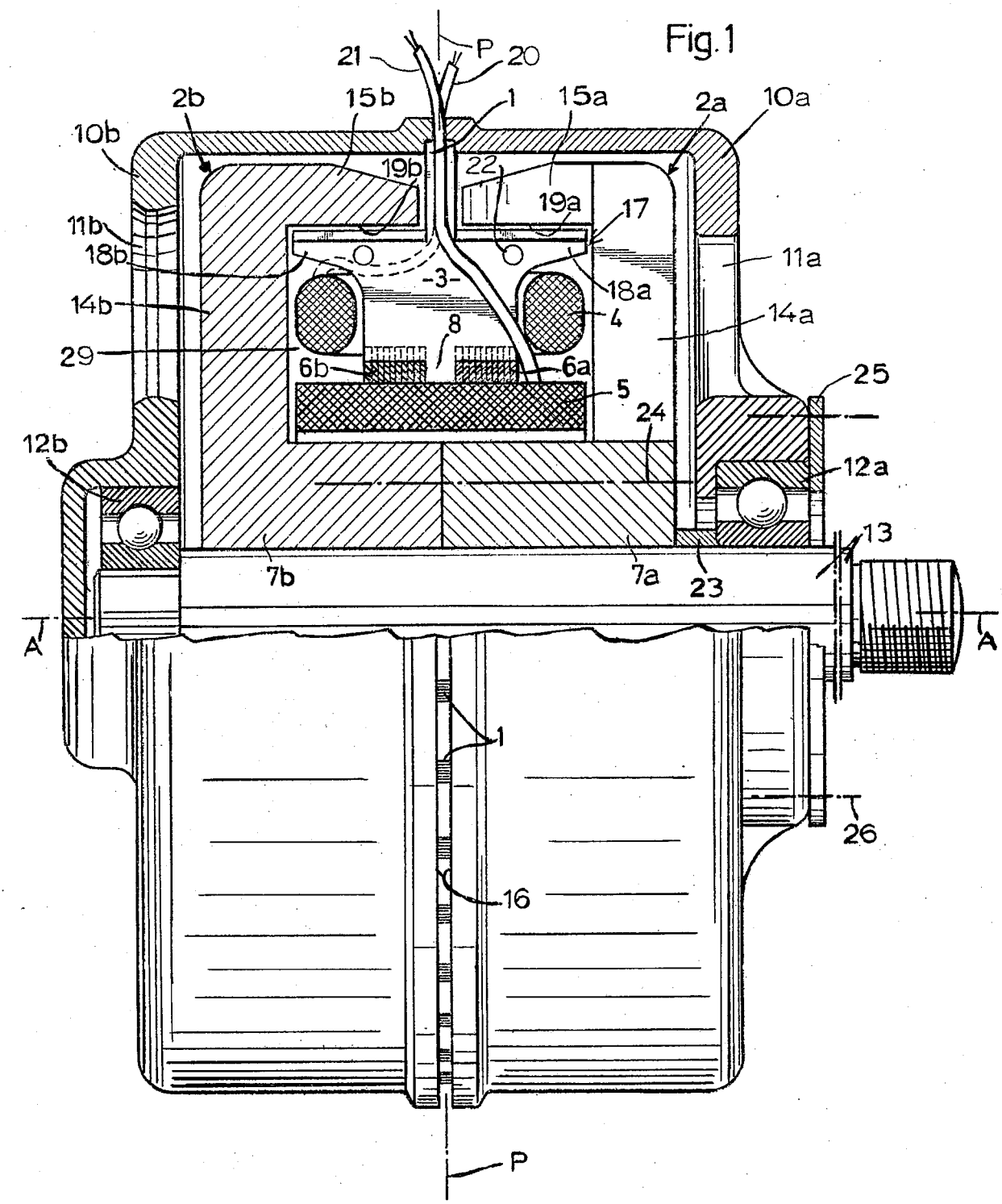
FIG. 1 is an elevational view, partly in axial section, of an alternator embodying my invention.

In FIG. 1 I have shown an alternator, i.e. an electrical machine for the generation of an alternating voltage, comprising a substantially cylindrical housing split into two generally mirror-symmetrical halves 10a, 10b formed with venting apertures 11a, 11b. Journaled in this housing, by means of ball bearings 12a and 12b, is a rotor shaft 13 with a threaded end adapted to receive a pulley 30 (see FIG. 6) driven from an external prime mover not shown. The shaft may also carry a fan 31 for blowing cooling air through the apertures 11a and 11b as likewise illustrated in FIG. 6.

Shaft 13 carries a rotor split into two substantially identical but relatively offset halves, comprising a hub 7a, 7b whose extremities are integral with radially extending arms 14a, 14b of generally L-shaped pole pieces 2a, 2b having axially disposed cheeks 15a, 15b which terminate short of a transverse midplane P, as do the two housing halves 10a and 10b. Seated within a gap 16 between these housing halves, and fastened thereto by soldering or other suitable means, are radially outwardly extending stems 1 of a set of generally T-shaped teeth 17 which pass between the two peripheral arrays of pole pieces 2a and 2b into an annular space 29 defined by the pole pieces and the hub, the cross-bar of the "T" having the shape of a web 3 of substantially greater width than the stem 1 as measured in the direction of a central axis A. Laterally extending wings 18a, 18b integral with web 3 have a span substantially twice the axial width of the web. The outer edges of these wings pass close to the inner edges of pole pieces 2a and 2b, paralleling the axially extending faces 19a, 19b of their cheeks 15a, 15b which are either flat or cylindrically curved about axis A and which are advantageously bounded by a parabolical outline, as seen in FIGS. 3 and 4, designed to induce a substantially sinusoidal voltage in armature windings 4 surrounding the webs 3 of the teeth 17. The inner edges of these webs are fitted into axially extending slots of a pair of axially spaced rings 6a, 6b forming a stator yoke, the teeth 17 also having radially inward extensions 8 sandwiched between these rings (see also FIG. 2). The yoke 6a, 6b supports an excitation coil 5 which spacedly surrounds the hub 7a, 7b and is conventionally energized via a nonillustrated rectifier from the output voltage of windings 4; these windings are bracketed by the yoke and the wings 18a, 18b. Leads 20 and 21 from the stationary windings 4 and 5 pass outwardly through the gap 16 to a nonillustrated load and the aforementioned rectifier, respectively.

All the rotor and stator parts 2a, 2b, 7a, 7b, 6a, 6b and 17 are made of magnetically permeable material whereby the flux induced by the winding 5 in hub 7a, 7b can readily pass through, say, pole pieces 2a into the wings 18a of teeth 17 while moving past them, thence through the webs 3 of these teeth and the yoke 6a, 6b into the webs of other teeth whose wings 18b then confront pole pieces 2b, and back to the hub in a magnetic circuit with narrow air gaps of large width resulting in a low flux density.

The stator parts are laminated, as shown, with the laminations of teeth 17 lying in planes parallel to axis A and the laminations of yoke 6a, 6b extending perpendicularly thereto. The laminations of the teeth are interconnected by spot welding, preferably under a protective argon atmosphere, as indicated at 22; similar welds, not shown, serve to hold the laminations of the yoke together. Riveting could be used instead of spot-welding.

Particularly in larger machines, it may be advantageous to insert insulating layers between the teeth and the yoke to prevent the flow of eddy currents.

In assembling the alternator of FIG. 1, rotor half 2b, 7b is press-fitted onto shaft 13 with housing half 10a separated from half 10b. Next, the stator is secured to housing half 10b together with coils 4 and 5 whereupon rotor half 7a, 2a is positioned on shaft 13 with insertion of a spacer ring 23 between the rotor and bearing 12a. Screws diagrammatically illustrated at 24 hold the rotor together as housing half 10a is emplaced and secured to the stator. An end disk 25 is bolted onto housing half 10a as indicated at 26 to hold the bearing 12a in place.

Figure 2:
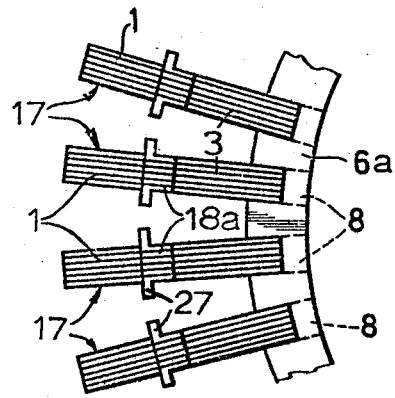
FIG. 2 is a fragmentary side view of a stator, with windings removed, forming part of the machine shown in FIG. 1.
Figure 3:
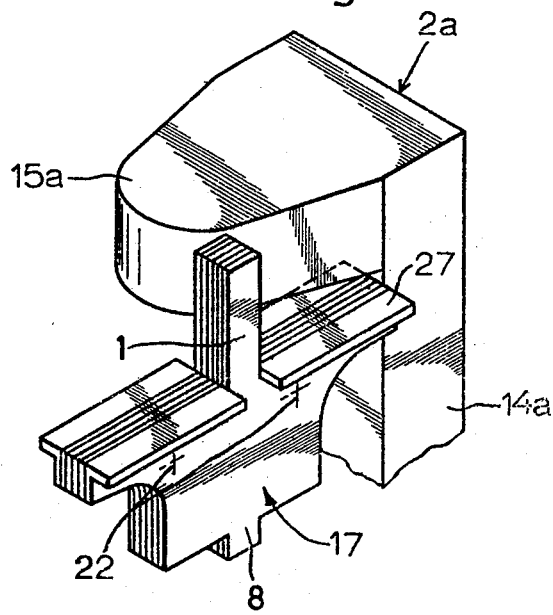
FIG. 3 is a fragmentary axonometric view of a stator tooth and a rotor pole piece included in the alternator of FIG. 1.
Figure 4:
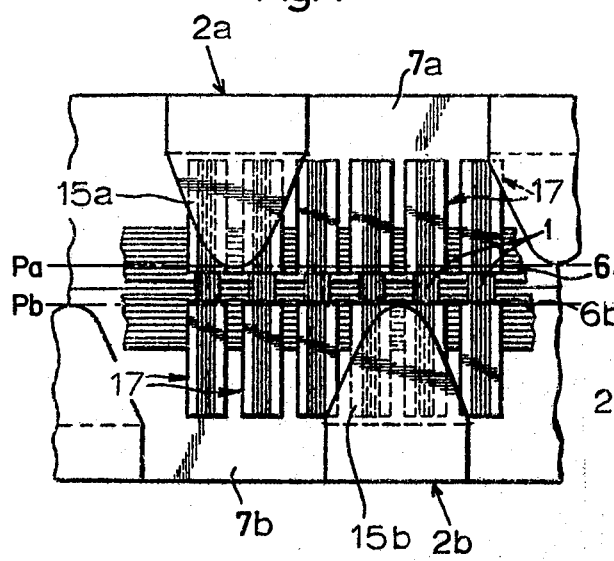
FIG. 4 is a fragmentary developed view of the rotor and the stator of the alternator of FIG. 1.

As illustrated in FIGS. 2 - 4, the teeth 17 may be provided with peripherally extending ledges 27 designed to enlarge their surfaces which confront the cheeks 15a, 15b of pole pieces 2a, 2b. FIG. 4 also shows that the two arrays of pole pieces 2a and 2b are peripherally offset from each other by half their pitch. That Figure further shows two radial planes Pa and Pb, parallel to the midplane P of FIG. 1, which are tangent to the confronting ends of the arrays of pole pieces 15a, 15b and are in proximity to the orbit of the stems 1 of teeth 17.

Figure 5:
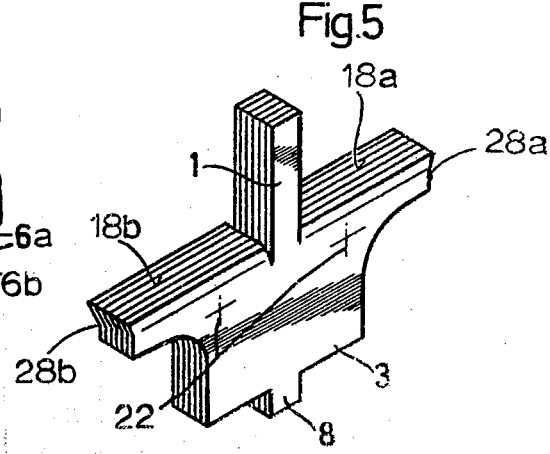
FIG. 5 is a view similar to FIG. 3, showing a modified tooth.

FIG. 5 shows a slightly modified tooth whose wings 18a, 18b lack the ledges 27 but are chamfered at their ends as indicated at 28a, 28b. This measure also increases, albeit to a smaller extent, the surface area confronting the pole pieces as compared with the average width of the tooth. Naturally, the two measures shown in FIGS. 3 and 5 can be combined.

Figure 6:
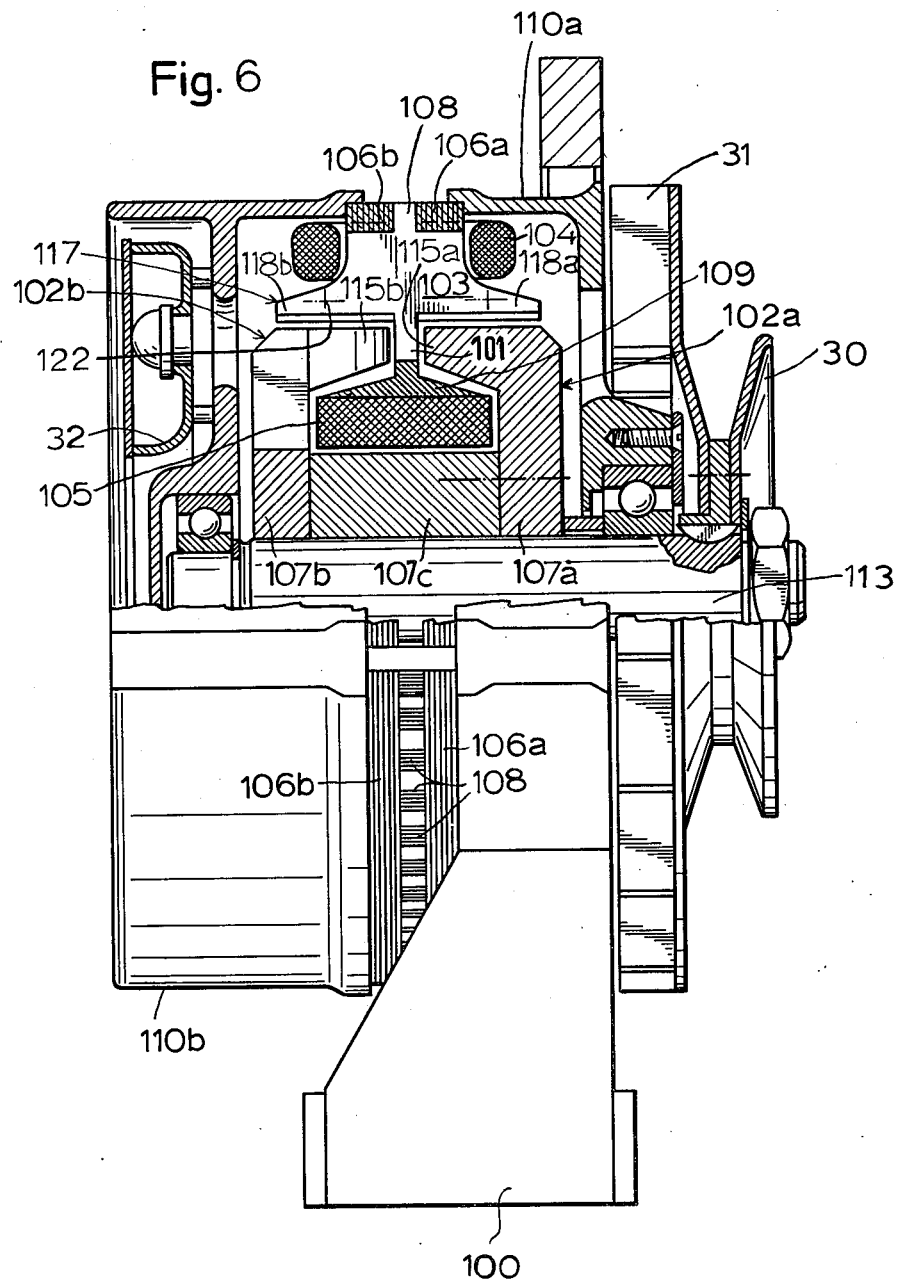
FIG. 6 is a view similar to FIG. 1, illustrating another embodiment of my invention.

In FIG. 6, in which elements corresponding to those of the preceding Figures have been identified by the same reference numerals augmented by 100, I have shown a housing 110a, 110b in which a shaft 113 is journaled and carries the aforementioned pulley 30 and fan 31, housing half 110a being supported in a frame 100. The stator teeth 117 are here inverted with reference to the arrangement of FIG. 1 and lie outside the rotor, the latter having a hub divided into extremities 107a, 107b rigid with pole pieces 102a, 102b and a central portion 107c spacedly surrounded by excitation coil 105. This coil is supported, within the annular space bounded by the pole pieces, on a mounting ring 109 which should not be magnetically permeable but which is advantageously integral with teeth 117 whose stems 101, passing through the gap between the cheeks 115a, 115b of the pole pieces, support that ring and the coil from the peripheral housing wall to which the yoke 106a, 106b of the stator is secured. Teeth 117, whose shape here corresponds substantially to that shown in FIG. 3, have outwardly pointing webs 103 with radial extensions 108 received between the transversely laminated yoke rings 106a, 106b these webs carrying the associated armature windings 104 outside the rotor. Wings 118a, 118b confront with their flat, extended surfaces the outer faces of cheeks 115a, 115b which are either flat or cylindrically curved about the housing axis. Housing half 102b is shown provided with an annular deflector 32 for the air flow emanating from the fan 31.

The operation of the machine shown in FIG. 6 is analogous to that of the preceding embodiment. Naturally, the stator teeth 117 could also be given the shape illustrated in FIG. 5.

I claim:

1. In an electrical machine comprising two relatively rotatable members centered on a common axis, one of said members having a magnetically permeable body which includes a magnetized hub and two axially spaced annular arrays of pole pieces rigid with opposite extremities of said hub, the other of said members including a set of peripherally spaced teeth interconnected by an annular yoke and positioned for magnetic interaction with said pole pieces, said yoke and said teeth being magnetically permeable, and armature windings surrounding said teeth, the pole pieces of one array having substantially axially extending faces on one side of a transverse midplane and being peripherally offset from the oppositely polarized pole pieces of the other array, the latter having substantially axially extending faces on the other side of said midplane, the improvement wherein said teeth are generally T-shaped in an axial plane with a stem passing radially along said midplane between said arrays and with an axially extending cross-bar positioned to pass close by said faces upon relative rotation of said members.

2. The improvement defined in claim 1 wherein said cross-bar has the shape of a web of substantially greater axial width than said stem and a pair of wings projecting laterally from said web in proximity to said pole pieces.

3. The improvement defined in claim 2 wherein said armature windings surround the webs of said teeth.

4. The improvement defined in claim 3 wherein said webs are fitted onto said yoke and arc of the same axial width as said yoke, said armature windings being bracketed by said wings and said yoke.

5. The improvement defined in claim 4 wherein said yoke comprises two axially spaced rings with axially notched peripheries proximal to said windings partly receiving said webs, each web being provided with a radial projection disposed between said rings.

6. The improvement defined in claim 5 wherein said teeth are composed of laminations parallel to said axis, said rings consisting of laminations transverse to said axis.

7. The improvement defined in claim 2 wherein said wings are provided with peripherally extending ledges enlarging their surfaces confronting said pole pieces.

8. The improvement defined in claim 2 wherein said wings have chamfered ends providing a maximum wing span proximal to said pole pieces.

9. The improvement defined in claim 1 wherein said pole pieces are generally L-shaped bars with arms extending radially from said extremities and axially extending cheeks on the free ends of said arms, said faces forming part of said cheeks.

10. The improvement defined in claim 1 wherein said faces have a substantially parabolical outline.

* * * * *

UNITED STATES PATENT AND TRADEMARK OFFICE
CERTIFICATE OF CORRECTION

PATENT NO. : 4,075,519
DATED : 21 February 1978
INVENTOR(S) : Ivan MRCUN

It is certified that error appears in the above-identified patent and that said Letters Patent are hereby corrected as shown below:

In the heading, after line [22] replace line [30] by:

[30] Foreign Application Priority Data

October 22, 1974   Yugoslavia  2819/74

October 22, 1974   Yugoslavia  2820/74 -- .

Signed and Sealed this

Thirtieth Day of May 1978

[SEAL]

Attest:

RUTH C. MASON
Attesting Officer

LUTRELLE F. PARKER
Acting Commissioner of Patents and Trademarks